US011638923B1

(12) United States Patent
Al-Zahrani et al.

(10) Patent No.: US 11,638,923 B1
(45) Date of Patent: May 2, 2023

(54) FLOTATION REAGENTS FROM ACIDIC OLIVE OIL

(71) Applicant: KING SAUD UNIVERSITY, Riyadh (SA)

(72) Inventors: Saeed Mohammed Al-Zahrani, Riyadh (SA); Arfat Anis, Riyadh (SA); Ranjan Kumar Dwari, Odisha (IN)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/016,978

(22) Filed: Sep. 10, 2020

(51) Int. Cl.
| | |
|---|---|
| *B03D 1/006* | (2006.01) |
| *B03D 1/016* | (2006.01) |
| *C01B 25/12* | (2006.01) |
| *B03D 1/008* | (2006.01) |
| *B03D 1/012* | (2006.01) |
| *B03D 1/02* | (2006.01) |
| *B03D 1/014* | (2006.01) |

(52) U.S. Cl.
CPC ............ *B03D 1/016* (2013.01); *B03D 1/008* (2013.01); *B03D 1/012* (2013.01); *B03D 1/014* (2013.01); *B03D 1/021* (2013.01); *C01B 25/12* (2013.01); *B03D 1/02* (2013.01); *B03D 2201/007* (2013.01); *B03D 2201/06* (2013.01); *B03D 2203/06* (2013.01)

(58) Field of Classification Search
CPC ........ B03D 1/016; B03D 1/008; B03D 1/012; B03D 1/021; B03D 1/014; B03D 2201/06; B03D 1/02; B03D 2203/06; B03D 2201/007; C01B 25/12
USPC ....................................................... 209/166
See application file for complete search history.

(56) References Cited

U.S. PATENT DOCUMENTS

| | | | |
|---|---|---|---|
| 4,687,571 A | 8/1987 | Kari et al. | |
| 5,223,147 A | 6/1993 | Rosenstock et al. | |
| 6,145,667 A | 11/2000 | Rothenberg et al. | |
| 6,409,022 B1 | 6/2002 | Rothenberg et al. | |
| 6,739,454 B2 | 5/2004 | Rothenberg et al. | |
| 2008/0093267 A1* | 4/2008 | Tran ...................... | B03D 1/006 209/166 |
| 2009/0065736 A1 | 3/2009 | Johnson et al. | |
| 2019/0046995 A1 | 2/2019 | Jorda et al. | |

FOREIGN PATENT DOCUMENTS

| | | |
|---|---|---|
| CN | 110947520 A | 4/2020 |
| DE | 3107305 A1 | 9/1982 |

OTHER PUBLICATIONS

Rajaeifar, MA et al., "Environmental impact assessment of olive pomace oil biodiesel production and consumption: A comparative lifecycle assessment", ENERGY 106 (p. 87-102, 2016.*
Patel et al., "Biodiesel from plant oils," Food, Energy, and Water the Chemistry Connection, 2015, pp. 277-307.
Serafini et al., "Production of Fatty Acid Methyl Esters from an Olive Oil Industry Waste," Brazilian Journal of Chemical Engineering, vol. 36, No. 1, Jan./Mar. 2019, pp. 285-297.

* cited by examiner

*Primary Examiner* — Thomas M Lithgow

(74) *Attorney, Agent, or Firm* — Nath, Goldberg & Meyer; Richard C. Litman

(57) ABSTRACT

The flotation reagents from acidic olive oil are made by transesterification of acidic olive oil. Acidic olive oil is olive oil having an acid value high enough to render it unsuitable for consumption, typically greater than 3.3% and/or between 3.3-7%. Transesterification of the olive oil with methanol converts fatty acids in the olive oil to an ester fraction and a glycerol fraction. The ester fraction may be sulfonated and used as the collector in a reverse flotation process, selectively removing the carbonate gangue from phosphate-carbonate rock in the froth, leaving phosphates in the sink. The glycerol fraction may be used without modification as the collector in the reverse flotation process. Both fractions are highly selective for carbonates, substantially reducing loss of phosphates in the froth.

2 Claims, No Drawings

FLOTATION REAGENTS FROM ACIDIC OLIVE OIL

BACKGROUND

1. Field

The disclosure of the present patent application relates to the separation of phosphorous and phosphates from phosphate ores having a high concentration of carbonate gangue, and particularly to flotation reagents from acidic olive oil that provide highly selective collectors for reverse flotation of phosphate minerals from phosphate-carbonate ores.

2. Description of the Related Art

Phosphorus (P) is typically obtained from the non-renewable source of phosphate rock. The main sources of phosphorus are different types of phosphates, including fluorapatite, hydroxy-apatite, francolite, etc. Phosphorus is one of the essential nutrient elements for all forms of life. Phosphorous is one of the main constituents in fertilizer, along with nitrogen and potassium. The world production of phosphate ores reached to about 220 million tons in 2014 and was expected to reach 258 million tons by 2018. Phosphate rock consists mainly of the well-known apatite mineral group, which has a general composition $Ca_{10}(PO_4, CO_3)_6(F, OH, Cl)_2$. A high percentage (about 90%) of the world production of phosphate ores is used for phosphoric acid production, which is the main component in fertilizer manufacturing. Other applications include animal feeds, insecticides, vitamins, drugs, soaps, detergents, beverages, ceramics, optical glass, toothpaste and dental cement.

Most of phosphate mineral reserves occur as sedimentary deposits. However, some phosphate deposits are found in igneous and metamorphic origins. Sedimentary phosphates have wide variations in their chemical composition and therefore display large variations in physical forms and types of associated gangue. Accordingly, these ores fall into one of three principal categories, namely, siliceous, clayey and calcareous.

Increasing demand for food worldwide increases demand for phosphate rock mining. Depletion of easy to beneficiate phosphate ore (concentrate and remove undesired materials, i.e., gangue minerals), such as siliceous ores, necessitates development of a cost-effective beneficiation process for difficult to process carbonaceous phosphate ores.

To be useful in the fertilizer industry, phosphate rock should contain at least 30% $P_2O_5$, less than 1% MgO, and no more than 1:4 of $CaO/P_2O_5$ ratio. To meet these requirements, siliceous phosphate ore that has quartz and clay as the main impurities are usually beneficiated by crushing, scrubbing, and subjecting to single or double (Crago) flotation. Flotation is widely used in the phosphate industry due to its low cost, simple operation, and high throughput. Currently, more than 60% of the world phosphate production is beneficiated by this process.

Upgrading calcareous phosphate, i.e., phosphate ore that contains calcite and dolomite as the main gangue by froth flotation is presently challenging, possibly due to similar physicochemical properties of these sparingly soluble minerals and apatite. An alternative to upgrading these ores is calcination (thermal decomposition of calcareous gangue) and selective acid leaching. However, calcination requires high energy consumption. The ore needs to be heated up to 950° C. for 1 hr, then leached by water to remove lime (CaO), followed by ammonium nitrate ($NH_4NO_3$) to remove magnesium. This process results in lower quality phosphate product by changing the surface properties of the phosphate in ways that reduce reactivity and solubility. Also, calcination is not suitable for all types of calcareous ores. The presence of quartz causes the formation of carbonate-silica complex ($CaSiO_3$), which hinders the removal of the carbonates.

Several researchers have investigated beneficiation of calcareous phosphate ores by froth flotation. However, these studies were mostly developed for specific types of ore, and are not necessarily applicable to all types of ore.

Different types of surfactants have been used in the flotation process to recover the mineral values from the ore. A collector is one of the surfactants that selectively makes a target mineral hydrophobic. During aeration in the flotation process, the target mineral gets attached to a bubble, which rises to the top of the slurry, allowing for separation from the gangue. However, the efficiency of the collector varies based on the ore properties and preparation and the desired mineral. Some collectors are observed to be more efficient for a particular mineral resource, but inefficient or ineffective with another resource. Therefore, it is essential to develop mineral specific collectors. Various factors affect the efficient response of the collector for the flotation of a mineral. One of the prime factors is the inherent surface properties of the mineral and the associated gangue mineral. If the surface property of one mineral is similar to another mineral, separation becomes difficult due to lack in selectivity.

Carbonate-phosphate rock mainly contains calcite, apatite or francolite, with minor contents of iron, magnesium and silica-bearing minerals. The phosphate rock may be beneficiated by using a reverse flotation process, where calcite is floated using a fatty acid ester as a collector at pH 5. The froth phase contains about 10-14% $P_2O_5$, and thereby a considerable amount of phosphorous oxide is lost in the tailings, suggesting inefficient selectivity of such a collector to calcite mineral.

Thus, flotation reagents from acidic olive oil solving the aforementioned problems are desired.

SUMMARY

The flotation reagents from acidic olive oil are made by transesterification of acidic olive oil. Acidic olive oil is olive oil having an acid value high enough to render it unsuitable for consumption, typically greater than 3.3% and/or between 3.3-7%. Transesterification of the olive oil with methanol converts fatty acids in the olive oil to an ester fraction and a glycerol fraction. The ester fraction may be sulfonated and used as the collector in a reverse flotation process, selectively removing the carbonate gangue from phosphate-carbonate rock in the froth, leaving phosphates in the sink. The glycerol fraction may be used without modification as the collector in the reverse flotation process. Both fractions are highly selective for carbonates, substantially reducing loss of phosphates in the froth.

The acidic olive oil may comprise a combination of unsaturated and saturated fatty acids. The major fatty acids in the waste acidic olive oil are typically oleic acid, palmitic acid, linoleic acid, stearic acid, linolenic acid, palmitoleic acid, eicosenoic acids and unsaturated derivatives thereof.

The collector is produced by transesterification of the waste acidic olive oil. The results of transesterification are separated into at least two fractions, including a top fraction and a bottom fraction, by density. The top fraction (which comprises product esters) and the bottom fraction (which comprises product glycerides) may each be used as collectors for the reverse flotation of phosphate ore. The collectors synthesized from acidic olive oil are more selective than previously used collectors, resulting in a better grade, yield and recovery of the phosphate ores.

These and other features of the present disclosure will become more apparent upon review of the following specification.

DETAILED DESCRIPTION OF THE PREFERRED EMBODIMENTS

The flotation reagents from acidic olive oil may be made by transesterification of acidic olive oil. According to the Food and Agricultural Organization of the United Nations (FAO)—Codex Standard for Olive Oil, Virgin and Refined and for Refined Olive-Pomace Oil (CODEX STAN 33-1981, Rev. 1-1989) in Section 3.2.2 of the FAO, the maximum percent acidity (acid value) allowed for any type of olive oil is 3.3. Any acid value above 3.3% renders the olive oil unsuitable for human consumption. For use in making the flotation reagents described herein, the acidic value may be greater than 3.3% and/or between 3.3-7%. In a particular embodiment, the acidic olive oil has an acid value of about 5%. The acidic olive oil may comprise a combination of unsaturated and saturated fatty acids. For example, the acidic olive oil may include, by volume, 25-100% unsaturated fatty acids and 0-75% saturated fatty acids. The acidic olive may contain, e.g., about 80% unsaturated fatty acids and about 20% saturated fatty acids. The major fatty acids in the waste acidic olive oil are typically oleic acid, palmitic acid, linoleic acid, stearic acid, linolenic acid, palmitoleic acid, eicosenoic acids and unsaturated derivatives thereof. An exemplary acidic olive oil may include about 66% oleic acid, about 17% palmitic acid and about 11.5% linoleic acid.

The collector is made by transesterification of the waste acidic olive oil. The transesterification may be performed using methanol in the presence of a base as catalyst. The results of transesterification are separated into two fractions, including a top fraction and a bottom fraction, by density, i.e., by sedimentation, demixing, centrifugation, or any other known means of separating transesterification products. The top fraction (which comprises product esters) and the bottom fraction (which comprises product glycerides) may each be used as collectors for the reverse flotation of phosphate ore.

The collectors synthesized from acidic olive oil are more selective than previously used collectors, resulting in a better grade, yield and recovery of the phosphate ores.

The collector for the separation of carbonates by flotation from phosphate ores may be synthesized by the transesterification of low acidic olive oil with methanol in the presence of a base as catalyst.

The collector may be one of the at least two fractions resulting from separation of the products of transesterification of acidic olive oil with methanol in the presence of a base catalyst, in particular, a top fraction and a bottom fraction. The bottom fraction may be used as the collector for carbonates by flotation from phosphate ores. The bottom fraction may be used in combination with fuel oil (e.g., kerosene or diesel oil) as collector for the carbonates by flotation from the phosphate ores.

The top fraction may be sulfonated and used as collector for calcite by flotation from the phosphate ores.

The top fraction may be sulfonated and combined with fuel oil to be used as the collector for carbonates by flotation from the phosphate ores.

A process for the separation of carbonates present in phosphoric rock by flotation includes the following. Ground phosphate-carbonate rock is mixed with water to form a slurry, the slurry is conditioned with the collector and other surfactants to form a chemically conditioned slurry, the chemically conditioned slurry is aerated to produce a foam, and the foam is separated along with the carbonates attached to the froths, leaving phosphates as a flotation residue.

The process may proceed as above using from 1 to 20 kg of the collector per ton of raw phosphoric rock used.

The collector has high flotation efficiency for calcite and has no affinity for apatite/francolite minerals.

The collector has high flotation efficiency for phosphate ore by yielding high-grade concentrates from a feed ore. The collector may also allow for reduced phosphates contained in a froth phase in a phosphate ore flotation.

The mineral beneficiation process uses froth flotation. The process removes calcite and other gangue, for example, iron-bearing minerals, magnesite, and silicates in a froth phase using the collector.

Froth flotation is a physicochemical process for recovering a valuable or desired mineral present in an ore. Several factors affect the froth flotation process, such as the desired mineral's characteristics, particle size, and particle liberation; pH of the slurry (mixture of ore solvents (typically water) to which reagents are added in a flotation process); a choice of collector, frother, and depressant; and a dosage of each element used. In the flotation process, the gangue minerals are depressed (lowered to the bottom of the flotation vessel) by using a depressant. The target mineral is selectively made hydrophobic by using the collector. The pH of the slurry is chosen to optimize adsorption of the collector on the target mineral only. After chemical conditioning, bubbles are generated by introducing air into the slurry system of the finely divided ore (aeration). The collector adhering to the target mineral renders the target mineral hydrophobic, changing the mineral's affinity for the air bubbles. After particle attachment, the bubbles rise to the top as a froth phase. The hydrophilic wetted mineral remains in the slurry and is discarded at the bottom. However, in the case of reverse flotation, the valuable mineral is depressed, while the gangue minerals are selectively made hydrophobic for removal in the froth phase during aeration.

Collectors are essential reagents used in a flotation process to recover or discard a mineral present in ore. The collector must selectively adsorb onto the target mineral (in flotation, it is the valuable mineral while in case of reverse flotation, it is the gangue mineral) even with the presence of many other similar mineral types. Flotation theory suggests that the one mineral type separates from another mineral based on their relative surface wettability. The collectors used in the flotation process to treat the ore are heteropolar surface-active agents. They lower the surface energy of the mineral by adsorbing onto its surface. The polar part adsorbs onto the particle surface, while the non-polar group orients to the bulk of the solution, thus facilitating a bridge for bubble attachment with the particle. However, the present reagents are not limited to flotation theory.

There are reagents available for the recovery of phosphate from the phosphate rock. However, they are not suitable for certain phosphate ores, such as the Al-Jalameed type phosphate ores (Table 1) found in Saudi Arabia. Therefore, there is a need to develop a collector that will provide increased recovery of phosphorous values with high-grade concentrate and reduce the loss of phosphate in the flotation tailings. A large quantity of phosphate rock has been processed by using the froth flotation system. The improved collector can result in a considerable increase in the recovery of the total quantity of phosphorus oxide. It will provide substantial economic advance, even with a modest increase in recovery. Thus, an improved process for froth flotation of oxide and carbonate minerals would fulfil a long-felt need and constitute a notable advancement in the art. Besides, the reagents currently being employed are derived from edible vegetable oils. Thus, the provision of utilizing non-edible waste oils, by itself, is a significant contribution to the art. Also, the improved developed reagent is a green surfactant, as it derived from a green resource.

In conjunction with the present reagents, a process is also provided for recovering phosphate minerals, which comprises crushing, grinding, and/or classification of the mineral to produce desired particle sizes for the flotation process; slurrying the liberated mineral in an aqueous medium; conditioning the slurry with optimum reagent dosage; and floating the gangue by reverse froth flotation method. A depressant may be added to the phosphate mineral. For example, phosphoric acid may be used as a depressant for phosphate minerals in the slurry. The phosphoric acid may be used in the range of 5-20 g/kg of phosphate ore. The pH may be adjusted to 2-8, 3-7, 4-6 or 5-6. The pH may be adjusted by addition of sulfuric acid, for example, in the range of 5-22 g/kg of phosphate ore. These surfactants may be either adsorbed onto the mineral or remain in the solution. A frother may be added to aid in the formation and maintenance of froth at the top of the flotation vessel. For example, pine oil may be used as a frother. Aeration may be performed by maintaining an air rate in the range of 2-6 L/min for aeration in the flotation cell.

Use of the collectors provides good recovery of valuable minerals at high grade or purity levels under normal froth flotation conditions. These reagents do not present excessive foaming problems. The collectors are synthesised by utilizing waste acidic olive oil and esterifying agents, such as methanol.

It should be understood that the amounts of materials for the methods described herein are exemplary, and appropriate scaling of the amounts is encompassed by the present subject matter, so long as the relative ratios of materials are maintained. As used herein, the term "about," when used to modify a numerical value, means within ten percent of that numerical value.

Flotation reagents, i.e., frothers, depressants, modifiers, and other collectors, may be substituted or added in the above flotation methods. Frothers may be any known substance that acts to stabilize the foam, such as pine oil, various alcohols (methyl isobutyl carbinol (MIBC)), polyglycols, xylenol (cresylic acid), etc. Depressants or inhibitors prevent floatation of certain minerals other than the mineral to be floated, and may include organic or inorganic depressants. Common organic depressants include starch and glue and common inorganic depressants include, for example, lime, sodium sulfite, sodium silicate, cyanide, and dichromate. Modifiers may be added to adjust any desired property during flotation, such as sulfurization, pH, viscosity, etc.

The present disclosure is illustrated by the following examples.

Example 1

Exemplary Collector Synthesis

An exemplary collector for the separation of carbonates from phosphate ores by froth flotation was synthesized by transesterification of acidic olive oil. The acidic olive oil had an acid value of 5.14%, not suitable for human consumption. It contained 79.9% unsaturated fatty acids, and 20.1% saturated fatty acids. The major fatty acids in the waste acidic olive oil were oleic acid—66.25%; palmitic acid—17.37%; and linoleic acid—11.51%. The transesterification products of the waste acidic olive oil were separated into two fractions by sedimentation. The top fraction (esters) and a bottom fraction (glycerides) were used as collectors for the reverse flotation of the phosphate-carbonate ore. The reverse flotation of the phosphate ore was successfully achieved using the glycerides of the transesterification product. The new collectors synthesized from acidic olive oil are more selective than previously used collectors, resulting in a better grade, yield, and recovery of the phosphate ores.

Example 2

Exemplary Flotation and Reverse Flotation Processes

In a flotation process, the crushed ore was deslimed to remove particles less than 38 μm in size. In the laboratory, desliming was performed by wet sieving. However, in industrial-scale processes, desliming is typically performed by using a hydrocyclone. The exemplary collectors were used as a collector for carbonates by flotation, as shown in Tables 2-3. The phosphate minerals (e.g., francolite) were depressed in the flotation process with $H_3PO_4$ (10%, v/v) and $H_2SO_4$ (20%, v/v) as follows. A slurry was formed from an aqueous solution with phosphate ore prepared as above, where the slurry was prepared to have 20% (w/w) solid phosphate ore in aqueous solution. Phosphoric acid ($H_3PO_4$) was added to the slurry to a concentration of 10% v/v, and the ore in the slurry was conditioned for 30 sec. After that, sulfuric acid ($H_2SO_4$) was added to the slurry to a concentration of 20% v/v, and the slurry was conditioned for a further 30 sec. The collector was added after depression of the phosphate minerals, and the ore in the slurry was conditioned for one minute. Pine oil was used as a frother. After conditioning of the phosphate ore with the flotation reagents, the slurry was aerated. On aeration, bubbles are generated and the hydrophobic carbonates attach to the bubbles and rise to the top, where they are collected as froth. After completion of the flotation process, the remaining froth and sink were allowed to settle, and water was removed by decantation. The residual froth and sink were each dried in an oven. The dried froth and sink were weighed and analyzed for $P_2O_5$ using X-ray fluorescence (XRF).

The collector was used alone for the flotation of calcite from a calcite-apatite mineral system. Collector selectivity was enhanced for some applications when used in combination with fuel oil, such as diesel, kerosene, etc. (see Tables 3-4), particularly for the collector selected from the bottom fraction. The ratio of synthesized surfactant and diesel oil should be in the range of 50:50-70:30, depending on the characteristics of the phosphate ore and desired mineral. Fuel oil alone is not an effective collector, but only enhances the efficiency of the present collector.

The phosphate ores used in the present examples are Saudi Al-Jalameed phosphate ores that have the following composition (Table 1):

TABLE 1

Exemplary phosphate-carbonate ore composition

| Name of Element | % of element present in bulk Sample |
|---|---|
| $P_2O_5$ | 22.61 |
| MgO | 2.90 |
| $SiO_2$ | 1.19 |
| CaO | 49.59 |
| $Al_2O_3$ | 0.29 |
| $Fe_2O_3$ | 0.16 |

Existing collectors are inefficient in the selective flotation of the calcite ore. The froth phase produced using such collectors typically have 10-12% $P_2O_5$. The present collectors have improved efficiency, resulting in 6% $P_2O_5$ in the froth phase. The present collector has better selectivity to calcite ore than existing collectors.

TABLE 2

Composition of the exemplary acidic olive oil

| Test | Unit | Amount | Limit of detection | Method ref. |
|---|---|---|---|---|
| Palmitic acid $C_{16}H_{32}O_2$ | Rel. % | 17.37 | 0.01 | AOAC-996.01 |
| Palmitoleic acid $C_{16}H_{30}O_2$ | Rel. % | 1.45 | 0.01 | AOAC-996.01 |
| Stearic acid $C_{18}H_{36}O_2$ | Rel. % | 2.41 | 0.01 | AOAC-996.01 |
| Oleic acid $C_{18}H_{34}O_2$ | Rel. % | 66.25 | 0.01 | AOAC-996.01 |
| Linoleic acid $C_{18}H_{32}O_2$ | Rel. % | 11.51 | 0.01 | AOAC-996.01 |
| Eicosanoic (arachidic) acid $C_{20}H_{40}O_2$ | Rel. % | .32 | 0.01 | AOAC-996.01 |
| Linolenic acid $C_{18}H_{30}O_2$ | Rel. % | .52 | 0.01 | AOAC-996.01 |
| 11-eicosanoic acid $C_{20}H_{38}O_2$ | Rel. % | .17 | 0.01 | AOAC-996.01 |
| Saturated fatty acid | % | 20.10 | 0.01 | AOAC-996.01 |
| Unsaturated fatty acid | % | 79.90 | 0.01 | AOAC-996.01 |
| Monounsaturated fatty acid | % | 67.87 | 0.01 | AOAC-996.01 |
| Polyunsaturated fatty acid | % | 12.03 | 0.01 | AOAC-996.01 |
| Trans fatty acid | % | 0.00 | 0.01 | AOAC-996.01 |

Table 2 summarizes the main components of the acidic olive oil used in synthesizing the present exemplary collectors. The acidic olive oil need not have the specific composition of table 2.

Example 3

Flotation of Saudi Al-Jalameed Phosphate Ores

Using the bottom fraction as the collector, the Saudi Al-Jalameed phosphate ore was processed according to the general procedure described above. The flotation experimental conditions were varied according to the parameters in Table 3 to illustrate their effect on the grade and recovery of the $P_2O_5$. Table 3 shows of the experimental results.

Using the bottom fraction collector with fuel oils, the Saudi Al-Jalameed phosphate ore was processed according to the general procedure described above. The following flotation experimental conditions were maintained: pH—5.2-5.5, RPM—900, Air Rate—5 l/m, depressant—15.30 g/Kg, 10% $H_3PO_4$ and 16.67 g/Kg, 20% $H_2SO_4$. Table 4 shows the experimental results.

TABLE 3

Experimental flotation results - Collector without fuel oil

| Sl. No. | Collector, g/kg ore | Impeller speed, rpm | Air rate, l/m | Frother g/kg | $H_3PO_4$ (10%, v/v) g/kg | $H_2SO_4$ (20%, v/v) g/kg | pH | Sink Yield, % | Sink $P_2O_5$, % | Froth Yield, % | Froth $P_2O_5$, % | Feed $P_2O_5$, % | $P_2O_5$ Recovery, % |
|---|---|---|---|---|---|---|---|---|---|---|---|---|---|
| 1 | 11.96 | 900 | 5 | 0.46 | 15.30 | 16.67 | 5.2-5.5 | 73.66 | 23.26 | 26.34 | 6.13 | 18.75 | 91.37 |
| 2 | 14.35 | 900 | 5 | 0.46 | 15.30 | 16.67 | 5.2-5.5 | 62.60 | 27.03 | 37.4 | 9.52 | 20.49 | 82.61 |
| 3 | 14.83 | 900 | 5 | 0.46 | 15.30 | 16.67 | 5.2-5.5 | 54.80 | 30.79 | 45.20 | 10.05 | 21.42 | 78.79 |
| 4 | 15.31 | 900 | 5 | 0.46 | 15.30 | 16.67 | 5.2-5.5 | 30.19 | 31.24 | 69.81 | 15.41 | 20.19 | 46.71 |
| 5 | 14.83 | 600 | 5 | 0.46 | 15.30 | 16.67 | 5.2-5.5 | 57.49 | 32.09 | 42.51 | 8.36 | 22.00 | 83.84 |
| 6 | 14.83 | 700 | 5 | 0.46 | 15.30 | 16.67 | 5.2-5.5 | 56.60 | 31.47 | 43.40 | 7.14 | 20.91 | 85.17 |
| 7 | 14.83 | 800 | 5 | 0.46 | 15.30 | 16.67 | 5.2-5.5 | 56.71 | 30.52 | 43.29 | 8.12 | 20.82 | 83.12 |
| 8 | 14.83 | 900 | 5 | 0.46 | 15.30 | 16.67 | 5.2-5.5 | 56.21 | 32.67 | 43.29 | 8.12 | 22.26 | 82.52 |
| 9 | 14.83 | 1000 | 5 | 0.46 | 15.30 | 16.67 | 5.2-5.5 | 46.47 | 31.53 | 53.53 | 12.76 | 21.49 | 68.20 |
| 10 | 14.83 | 700 | 2 | 0.46 | 15.30 | 16.67 | 5.2-5.5 | 61.28 | 30.19 | 38.72 | 6.64 | 21.08 | 87.79 |
| 11 | 14.83 | 700 | 3 | 0.46 | 15.30 | 16.67 | 5.2-5.5 | 55.54 | 32.60 | 44.46 | 7.96 | 21.65 | 83.67 |
| 12 | 14.83 | 700 | 4 | 0.46 | 15.30 | 16.67 | 5.2-5.5 | 54.28 | 32.35 | 45.72 | 9.19 | 21.77 | 80.68 |
| 13 | 14.83 | 700 | 5 | 0.46 | 15.30 | 16.67 | 5.2-5.5 | 52.06 | 30.94 | 47.94 | 11.29 | 21.52 | 74.85 |
| 14 | 14.83 | 700 | 6 | 0.46 | 15.30 | 16.67 | 5.2-5.5 | 48.35 | 31.84 | 51.65 | 11.18 | 21.17 | 72.72 |
| 15 | 14.83 | 700 | 3 | 0.00 | 15.30 | 16.67 | 5.2-5.5 | 59.23 | 29.04 | 40.77 | 6.47 | 19.84 | 86.70 |
| 16 | 14.83 | 700 | 3 | 0.11 | 15.30 | 16.67 | 5.2-5.5 | 59.01 | 29.46 | 40.99 | 6.87 | 20.20 | 86.06 |
| 17 | 14.83 | 700 | 3 | 0.23 | 15.30 | 16.67 | 5.2-5.5 | 59.10 | 30.38 | 40.90 | 6.61 | 20.66 | 86.90 |
| 18 | 14.83 | 700 | 3 | 0.46 | 15.30 | 16.67 | 5.2-5.5 | 55.54 | 32.60 | 44.46 | 7.96 | 21.65 | 83.63 |
| 19 | 14.83 | 700 | 3 | 0.68 | 15.30 | 16.67 | 5.2-5.5 | 56.94 | 28.35 | 43.06 | 7.30 | 19.24 | 83.70 |
| 20 | 14.83 | 700 | 3 | 0.91 | 15.30 | 16.67 | 5.2-5.5 | 59.66 | 29.71 | 40.34 | 7.20 | 20.63 | 85.91 |
| 21 | 14.83 | 700 | 3 | 0.46 | 10.20 | 16.67 | 5.2-5.5 | 63.59 | 30.57 | 36.41 | 6.40 | 21.77 | 89.29 |
| 22 | 14.83 | 700 | 3 | 0.46 | 15.30 | 16.67 | 5.2-5.5 | 62.72 | 30.90 | 37.28 | 6.31 | 21.74 | 89.17 |
| 23 | 14.83 | 700 | 3 | 0.46 | 20.40 | 16.67 | 5.2-5.5 | 62.43 | 31.14 | 37.57 | 5.37 | 21.59 | 90.03 |
| 24 | 14.83 | 700 | 3 | 0.46 | 15.30 | 16.67 | 4.5-4.8 | 72.93 | 28.34 | 27.07 | 5.92 | 22.27 | 92.81 |
| 25 | 14.83 | 700 | 3 | 0.46 | 15.30 | 16.67 | 5.2-5.5 | 63.02 | 30.15 | 36.98 | 6.63 | 21.45 | 88.58 |
| 26 | 14.83 | 700 | 3 | 0.46 | 15.30 | 16.67 | 5.7-6.0 | 69.48 | 27.42 | 30.52 | 8.37 | 21.61 | 88.17 |

TABLE 3-continued

Experimental flotation results - Collector without fuel oil

| Sl. No. | Collector, g/kg ore | Impeller speed, rpm | Air rate, l/m | Frother g/kg | $H_3PO_4$ (10%, v/v) g/kg | $H_2SO_4$ (20%, v/v) g/kg | pH | Sink Yield, % | Sink $P_2O_5$, % | Froth Yield, % | Froth $P_2O_5$, % | Feed $P_2O_5$, % | $P_2O_5$ Recovery, % |
|---|---|---|---|---|---|---|---|---|---|---|---|---|---|
| 27 | 14.83 | 700 | 3 | 0.46 | 15.30 | 16.67 | 6.2-6.5 | 45.61 | 26.86 | 54.39 | 15.46 | 20.66 | 59.31 |
| 28 | 14.83 | 700 | 3 | 0.46 | 15.30 | 16.67 | 5.2-5.5 | 60.65 | 31.35 | 39.35 | 6.45 | 21.55 | 88.23 |

TABLE 4

Experimental flotation results - Collector combined with fuel oil

| Sl. No. | Collector g/kg | Diesel g/kg | Frother g/kg | Froth Wt. % | Conc. Wt. % | % $P_2O_5$, Head | % $P_2O_5$, Froth | % $P_2O_5$, Conc. | % $P_2O_5$, recovery to froth | % $P_2O_5$, recovery to conc. |
|---|---|---|---|---|---|---|---|---|---|---|
| 1 | 22.2 | 8.32 | 0.46 | 25.90 | 74.10 | 24.11 | 16.36 | 26.82 | 17.57 | 82.43 |
| 2 | 22.2 | 16.64 | 0.46 | 28.61 | 71.39 | 24.60 | 15.29 | 28.33 | 17.78 | 82.22 |
| 3 | 37.0 | 8.32 | 0.46 | 29.07 | 70.93 | 24.47 | 12.50 | 29.38 | 14.85 | 85.15 |
| 4 | 37.0 | 16.64 | 0.46 | 36.40 | 63.60 | 24.57 | 13.83 | 30.71 | 20.50 | 79.50 |
| 5 | 37.0 | 16.64 | 0.46 | 34.26 | 65.74 | 24.00 | 10.87 | 30.85 | 15.52 | 84.48 |
| 6 | 37.0 | 16.64 | 0.46 | 30.54 | 69.46 | 25.37 | 12.73 | 30.93 | 15.32 | 84.68 |
| 7 | 37.0 | 24.96 | 0.46 | 32.38 | 67.62 | 22.80 | 11.18 | 28.36 | 15.88 | 84.12 |
| 8 | 37.0 | 31.20 | 0.46 | 29.76 | 70.24 | 24.31 | 10.41 | 30.20 | 12.74 | 87.26 |
| 9 | 46.9 | 39.52 | 0.46 | 26.57 | 73.43 | 23.53 | 16.10 | 26.22 | 18.18 | 81.82 |

It is to be understood that the flotation reagents from acidic olive oil are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A flotation reagent from acidic olive oil, comprising: a mixture of esters of fatty acids contained in the acidic olive oil from transesterification of the acidic olive oil with methanol in presence of a base, wherein the mixture of esters is sulfonated.

2. The flotation reagents from acidic olive oil according to claim 1, wherein the acidic olive oil is at least 3.3% acid, the acidic olive oil being waste olive oil not suitable for human consumption.

* * * * *